US007698652B2

(12) United States Patent
Sagar

(10) Patent No.: US 7,698,652 B2
(45) Date of Patent: Apr. 13, 2010

(54) RAPID RETRIEVAL USER INTERFACE DESIGNED AROUND SMALL DISPLAYS AND FEW BUTTONS FOR SEARCHING LONG LISTS

(75) Inventor: Richard Bryan Sagar, Santa Clara, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 2289 days.

(21) Appl. No.: 09/780,229

(22) Filed: Feb. 9, 2001

(65) Prior Publication Data

US 2002/0109709 A1    Aug. 15, 2002

(51) Int. Cl.
*G06F 3/00* (2006.01)

(52) U.S. Cl. ............... 715/787; 715/784; 715/785; 715/786

(58) Field of Classification Search .......... 345/830, 345/973; 715/787, 784, 785, 786
See application file for complete search history.

(56) References Cited

U.S. PATENT DOCUMENTS

| 5,550,559 | A | * | 8/1996 | Isensee et al. ............... 345/684 |
| 5,680,561 | A | * | 10/1997 | Amro et al. ................. 345/787 |
| 5,772,635 | A | * | 6/1998 | Dastur et al. ................ 604/131 |
| 5,977,975 | A | * | 11/1999 | Mugura et al. .............. 345/822 |
| 6,204,846 | B1 | * | 3/2001 | Little et al. ................. 345/784 |
| 6,225,996 | B1 | * | 5/2001 | Gibb et al. .................. 345/784 |

* cited by examiner

*Primary Examiner*—Simon Ke

(57) ABSTRACT

In a user-interface application, a computing apparatus has a user-interface to assist the user in searching for information from a data array. In an example embodiment according to the present invention, the data array is an ordered list of addresses. In a UI so equipped, the user experiences a particular sequence of events. The user begins at a point on a list of addresses. After the user presses the scroll key, the list rolls down a low rate. As the user continues to hold down the scroll button the scroll accelerates. After a predetermined time, a helper character is displayed. This character may represent a first letter of a name or a first digit of a telephone number. The UI displays the helper character to the user. The user continues to hold the scroll button until a help character, corresponding to his/her desired selection, appears. The user releases the scroll button and may slowly browse among a smaller group of data to locate the particular selection.

19 Claims, 4 Drawing Sheets

User starts at some point in the list

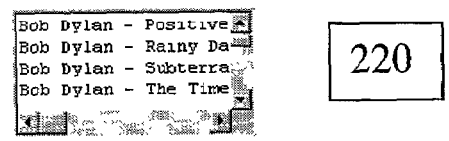

Scrolling starts off slow (one line per second)

But soon speeds, so it is difficult to read the entries as they pass by

Large "helper" letter replaces list

This now increments at a rate of approximately 1/second...

as long as the user holds down the scroll button

When the user reaches the vicinity of interest they release the scroll button

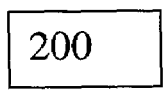 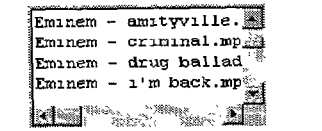 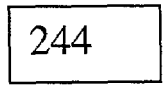

The list of entries returns to the screen

FIG. 2

```
***    Pseudo C Code    ***
if (ScrollButtonPressed)
{
        if (ButtonPressed == BUTTON_UP)
        {
                DirectionOfScroll = SCROLL_UP;
        }
        else
        {
                DirectionOfScroll = SCROLL_DOWN;
        }
        if (ButtonPressDuration < T1)
        {
                ScrollStyle = SLOW;
        }
        else if (ButtonPressDuration >= T1)
        {
                ScrollStyle = FAST;
        }
        else if (ButtonPressDuration >= T2)
        {
                ScrollStyle = HELPER;
        }
}
else // Scroll Button Not Pressed
{
        ScrollStyle = NONE;
}
if (ScrollStyle == SLOW)
{
        wait(SlowScrollDelayLength);
        MovePointerInArray(DirectionOfScroll);
        DisplayNewArrayEntry;
}
if (ScrollStyle == FAST)
{
        wait(FastScrollDelayLength);
        MovePointerInArray(DirectionOfScroll);
        DisplayNewArrayEntry;
}
if (ScrollStyle == HELPER)
{
        wait(HelperScrollDelayLength);
        ChangeHelperCharacter(DirectionOfScroll)
        DisplayNewHelperCharacter;
}
*** Pseudo C Code End ***
```

FIG. 4

RAPID RETRIEVAL USER INTERFACE DESIGNED AROUND SMALL DISPLAYS AND FEW BUTTONS FOR SEARCHING LONG LISTS

FIELD OF INVENTION

The present invention is generally directed to electronic devices and their user-interfaces. In particular, the present invention relates to a user-interface suitable for portable electronic devices.

BACKGROUND OF INVENTION

The increasing functionality of electronic devices provides the user more convenience in adapting a piece of gear to his or her specific requirements. With the increasing number of features available in a piece of gear there has not been a concomitant increase of the gear's size. Technology has made it possible to pack many transistors in the underlying circuits that make up the gear. For example, computing capability that once required a space on a tabletop now fits in the palm of one's hand. Similar trends are exhibited in audio/visual equipment, wireless telephones, diagnostic medical equipment and the like. Consequently, the user-interface is scaled-down with the size of the equipment.

Although one can miniaturize the equipment, a challenge exists to enable the user to easily interact with such equipment and yet maintain features. Human physiology sets limits as to how small a piece of equipment may be made and yet still be sufficiently convenient and enjoyable to use. Attributes found on larger gear, for example a laptop computer, the keyboard and display provide high functionality and ease of use. The keyboard accommodates the hands and the display is easy to read. However, such attributes may have to be sacrificed in going smaller. However, the sacrifice cannot be so great as to render the miniaturized gear too bothersome and too limited in capability.

SUMMARY OF INVENTION

There exists a need to provide a user-interface (UI) that maintains functionality and ease of use while keeping the size of the screen and number of buttons for the interface small. The present invention is exemplified in a number of implementations, a number of which are summarized below.

In one embodiment according to the present invention, a data processing apparatus has a user interface assisting in the searching of information from a data array that comprises an array scroller responsive to user actuation. A helper character-generator actuated by continued user actuation of the array scroller is operative to display a helper character representative of a portion in the list being scrolled. An additional feature of this embodiment is that the helper character may show additional helper characters by unactuating the array scroller and reactuating the array scroller.

In another embodiment according to the present invention, in a data processing environment, there is a method for enabling a user to scroll through an ordered list in a data array accessible through a data processing device. The method comprises enabling the user to scroll through the list, in response to the user actuating the data processing device and generating a helper character representative of a portion of the list being scrolled.

In yet another embodiment according to the present invention, there is a service supplied in a client-server configuration. The server provides user-access to an ordered list of information items and the client is enabled to interact with the server. The server controls the client to display a helper character representative of a portion of the list currently being scrolled at the client.

In yet another embodiment according to present invention, an information storage medium comprises and ordered list of content information items. There is at least one respective helper character corresponding with a respective one of the items. Control software controls a rendering of a specific one of the helper characters during the scrolling of the corresponding one of the items.

The above summaries of the present invention are not intended to represent each disclosed embodiment, or every aspect, of the present invention. Other aspects and example embodiments are provided in the figures and the detailed description that follows

BRIEF DESCRIPTION OF THE DRAWINGS

The invention may be more completely understood in consideration of the following detailed description of various embodiments of the invention in connection with the accompanying drawings, in which:

FIG. 2 depicts the process of FIG. 1 as applied to an example user-interface;

FIG. 4 depicts example program code used in implementing an embodiment according to the present invention.

Figure 1:
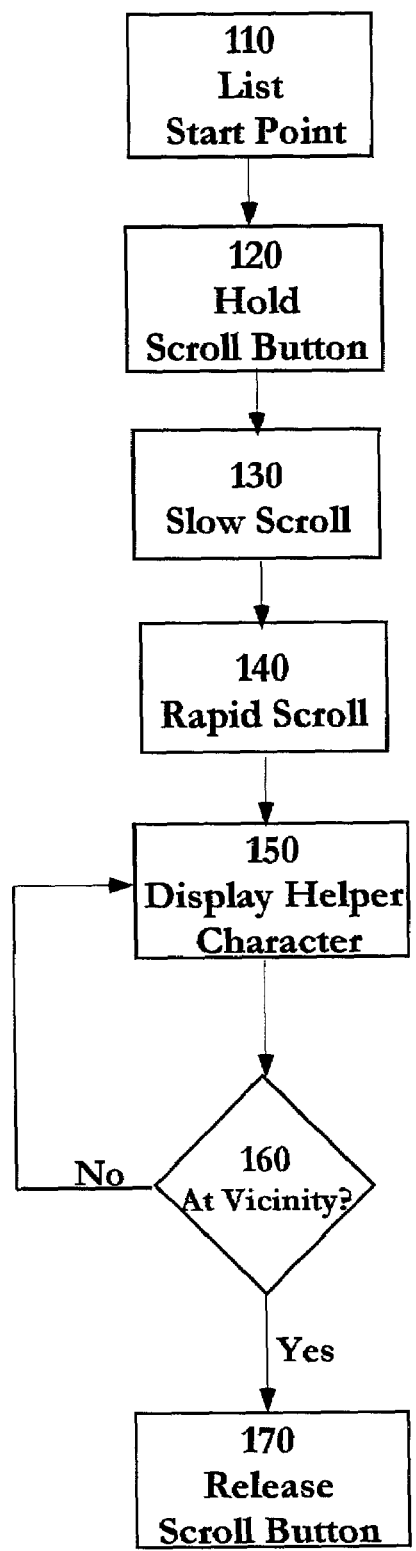
FIG. 1 outlines the process of selecting an item on a list according to an embodiment of the present invention.

While the invention is susceptible to various modifications and alternative forms, specific embodiments thereof have been shown by way of example in the drawings and will herein be described in detail.

DETAILED DESCRIPTION

The present invention has been found to be useful and advantageous in connection increasing the efficiency and ease-of-use in a device, application, or service built with and designed to utilize minimal computing resources. This may include small displays found on, e.g., personal digital assistants (PDAs), telephone handsets, MP3 players, global positioning receivers (GPS), and automobile dashboard displays. Space constraints of these devices may limit the number of buttons and their functionality to control these small displays. This may also include network services of a distributed computing environment such as the World Wide Web. The maximizing of efficiency by using the invention provides the user more convenience in reducing bandwidth requirements of the network in searching for and retrieving of information. Moving less data back and forth across the network saves time. Further information about graphical user interfaces (GUI) employed by the aforementioned devices may be found in a patent application titled, "Hand-Held with Auto-Zoom for Graphical Display of Web Page, Ser. No. 09/619,426 filed Jul. 19, 2000, incorporated by reference in its entirety herein.

Within the context of the invention, a user selects an item from an ordered list, such as a file list from a computer, a name from a telephone directory, or a town name from a database. In an example application, the user is typically presented with a scrollable list on the display, with the ability to scroll the list and the ability to select an item on the list. The ability to scroll is via "Up/Down" buttons, either physical or logical (in the form of a scroll bar). The ability to select is usually via a Select or Enter key.

When faced with a long list of items and a small display, it is often difficult to scroll through the list. If the screen is small, items do not stay on the screen for a very long time. Scrolling therefore needs to be done slowly, to allow the eye/brain to see the item for long enough to read it. On a large screen this is less of a problem, as the eye can track an item as it scrolls across the screen.

For a long list, it is desirable to scroll fast; otherwise the time taken to access the desired element in the list is annoyingly long. However, fast scrolling is in conflict with the previous point. The usability of a number of devices is constrained by the retrieval of data from a long list. For example, in a cellular phone (for the user's address book), these devices may have, or may have access to, address books hundreds of entries in length. Scrolling through the entries to select a number to dial is most desirable, as it can be done with just the thumb of one hand. In a PDA, databases such as the address book or other databases may be hundreds or thousands of entries in length. Also, portable audio jukeboxes -and MP3 players can now hold many tracks of music on an internal hard disk or solid state memory, but the unit itself is no larger than a traditional portable CD player. Typically as a cost and size saving the UI is via a display a few lines long and three or four buttons.

In a conventional UI, when the user starts to scroll through a long list, the scroll rate increases after a few seconds of holding down the scroll key. Entries in the list then scroll by at a rate that is almost impossible to read, particularly on a small screen. On portable device displays, the problem is compounded by the poor refresh rate of the liquid crystal display (LCD) technology used.

In a UI according to an embodiment of the present invention, the user experiences a particular sequence of events. The user begins at some point on a list. After the user presses the scroll key, the list rolls down at a low rate. As the user continues to hold down the scroll button the scroll accelerates. After a predetermined time (e.g., about a second), a helper character is displayed. This character may represent a first letter of a name or a first digit of a telephone number. The character displayed is representative of a cluster of entries in the ordered list at the position currently being scrolled over. The UI displays the helper character to the user. The user continues to hold the scroll button until a help character, corresponding to his/her desired selection, appears. The user releases the scroll button and may slowly browse among a smaller group of data to locate the particular selection.

Refer to FIG. 1. The process, according to the present invention, is outlined. The procedure 100 begins a list start point 110. The search is begun when the user holds the scroll button 120. The UI does a slow scroll 130 then proceeds to a rapid scroll 140. A helper character is displayed 150. The helper character 150 represents the cluster of data currently being scrolled over. The user observes the display until the helper character displayed is in the vicinity 160 of the data he/she desires; that is, the helper character indicates the cluster sought. Having found the desired data, the user releases the scroll button 170.

Refer to FIG. 2. In an example screen UI 200, the user starts at a point in an alphabetically ordered list 210 whose entries begin with the letter "B." The user is interested in viewing an entry whose name begins with the letter "E." The user presses the scroll key; the list starts to step down at a low rate. Scrolling starts off slowly at the rate of about one line per second 220.

Soon the scrolling speeds up 230. After a predetermined time ($T_1$) the screen area for the scrolling list is replaced by a single large character representing the first character of the item that is currently displayed in the window (or on the first line of the window for a window that has multiple lines). It is difficult to read the entries as they pass; a large "helper" letter ("B") 240 supersedes above the list.

After some time ($T_2$) the character increments to the next possible value, as long as the user is holding down the scroll key. For example, in an alphabetically sorted list of names, the user might have started scrolling from "C", after holding the key down for 3 seconds, stepping slowly through the entries starting with "C", the list of discrete entries is replaced by a large "C" which overlaps the whole UI. As long as the user continues to hold down the scroll key, the letter will change, at about one second intervals to "D", then "E", etc The list goes through the alphabet, as depicted by helper letters "C" 241, "D" 242, and "E" 243. The user releases the scroll button, having reached the vicinity of interest, 244 upon viewing the helper letter "E" 243. When the user finally releases the scroll key, the entry in the list "closest" to the helper letter (or letters) is selected and displayed as the first item in the scroll list window in the UI screen 200.

In another example embodiment, the character displayed on the screen during the fast scroll does not necessarily need to be tied to the entries in the list being scrolled. For instance, the list may contain an alphabetically sorted list of names, with no entries for "L" and "M", but that does not mean that the fast scroll mechanism needs to skip those letters during its operation. There are advantages in doing this. The list need not be traversed to retrieve entries for each increment, hence saving processing time. The user is not "caught-out" by the list suddenly jumping from "K" to "N".

The example embodiment may also incorporate "decelerating" the scroll. If the user releases the scroll key momentarily during the "fast scroll", but re-presses the key before a certain time elapses ($T_3$), the scroll continues. Rather than the single character being displayed incrementing on screen at the $T_2$ rate, a second letter appears alongside the first and that would increment instead. For example, the display would increment as "EA," "EB," "EC." This of course can be extended to a third and four letters, as appropriate for a given application. Each subsequent short release of the scroll key adds an additional letter to the display. The helper display encompasses a smaller subset of scrolling data.

As explained above with respect to some examples, aspects of the invention reside in providing an ergonomic user-interface for finding a specific information item in an ordered list or array. While scrolling through the list or array, the representations of the individual items get blurred and cannot be recognized anymore. An aspect of the invention addresses the issue of displaying a meta item that is representative of a group of items that is currently being scrolled.

The ergonomic user-interface may also include not only graphical, visually oriented user-feedback of the helper character but may include aurally oriented audio feedback or touch-oriented tactile feedback. For example, one who is blind may be able to use such an equipped device to listen to the helper character or feel a Braille representation thereof.

Figure 3:
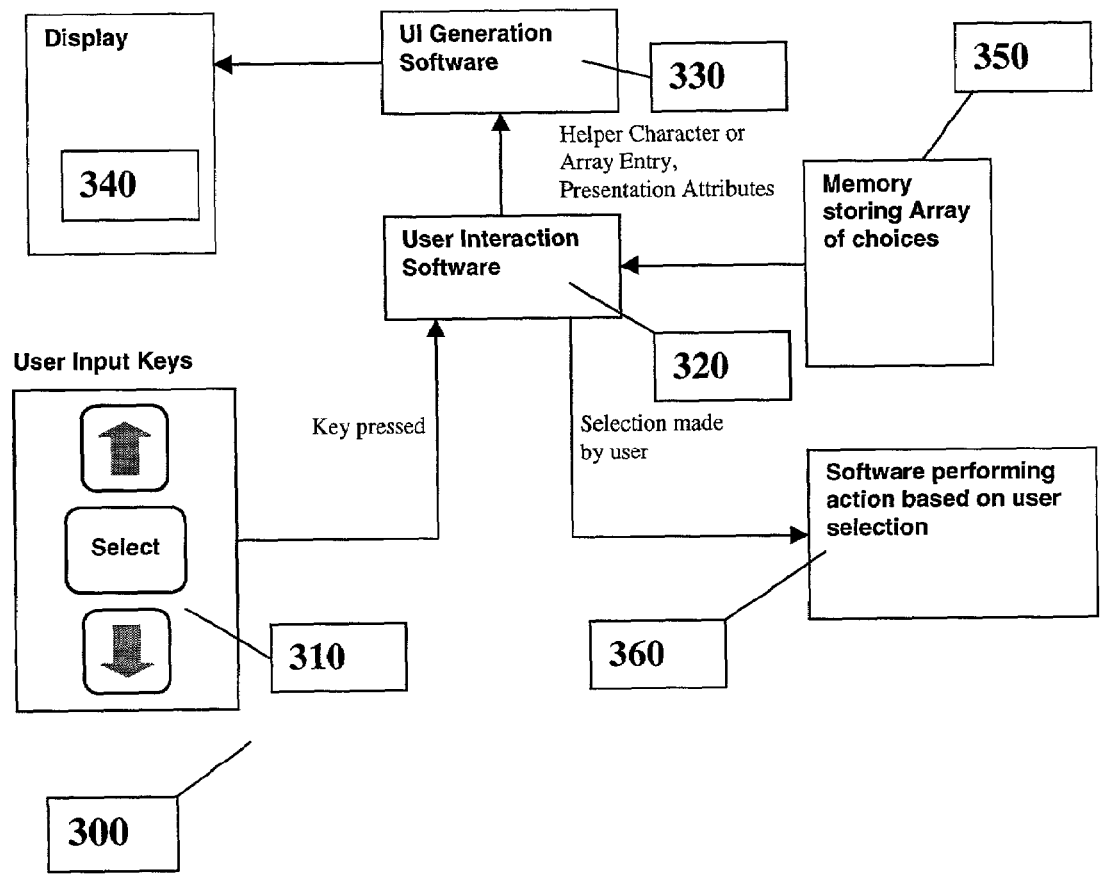
FIG. 3 depicts an example embodiment according to the present invention as is implemented in a handheld device.

The invention may be implemented on a handheld device in an example embodiment according to the present invention. Refer to FIG. 3. As depicted in a block diagram, a handheld device 300 comprises a user interface 310 and a display 340. The user may press a key in the user interface 310 to scroll either up or down. User interaction software 320 works in response to the selected pressed key and the array of choices stored in memory 350. In example handheld device, the memory 350 may have addresses and phone numbers. The user interaction software 320 provides output to software performing an action based on the user selection 360 and to user interface generation software 330. The UI generation software 330 generates information for the display 340 to depict the helper character or array entry along with presentation attributes such a font style, size, color, and object placement.

The invention may also be implemented as a service. Consider an Internet-enabled wireless handheld device. The list or array is residing at a server and the handheld is a client device that is enabled to interact with the remote server. Instead of scrolling visually through all items, the service now controls the device to display a meta item that is representative of the group of items currently being scrolled. Preferably, the service takes into account network delay, e.g., through pinging. This then adjusts the showing of the meta item for network latencies. In this manner, the user can scroll through, e.g., a telephone list or a list of electronic files residing at the server.

An example program to implement an embodiment according to the present invention may be found in FIG. 4. A programming language 400, such as "C" may be used to carry out the functions described in FIG. 3. A number of functions may be described. DisplayNewHelperCharacter 410, calls the UI Generation Software with the appropriate text, font information and decoration as appropriate for the display driver. MovePointerinArray 420 selects the appropriate entry from the Array, to display on the screen, taking into account the direction of the change (UP or DOWN) and whether the end of the list has been reached. ChangeHelperCharacter 430 selects the next helper character to display, taking into account the Direction of change (UP or DOWN), whether the end of the list has been reached and the next valid character, based on the array.

The invention is not limited to a one-dimensional ordered list, such as an alphabetically or numerically ordered inventory. It may apply to a multi-dimensional list, as well. Consider a geographic region. When traveling from a point A to a point B in this region, one passes predetermined points (e.g., streets, towns, or counties) in a predetermined order. A map of this region can be represented electronically. This map is visible only partly, and the user can scroll up/down and left/right, and preferably in other directions. When scrolling fast, the map details get blurred and do not convey any information anymore. An aspect of the invention is to represent the parts of the map thus traversed by a steadier meta item, such as the name of the county or district currently being scrolled through. Note that the meta item represents the map information at a higher level than the map representation itself.

Information-storage media may utilize an embodiment of the present invention recorded thereon. Information storage media may include optical disks, magnetic disks, semiconductor memory, and ferro-electric memory. For example, in a DVD disk a recorded movie may be indexed with helper film clips to assist the user to locate a particular scene of the movie.

In addition, the invention is not limited to characters of particular language. For example, pictographic languages such as Chinese or Japanese may be placed in a sorted list. The helper character may follow the arrangement of words that may be found in a Chinese or Japanese dictionary.

While the present invention has been described with reference to several particular example embodiments, those skilled in the art will recognize that many changes may be made thereto without departing from the spirit and scope of the present invention, which is set forth in the following claims.

What is claimed:

1. An apparatus having a user interface assisting in searching for information from items of an ordered list in a data array, the items having descriptions, the apparatus comprising:
   a display;
   an array scroller for sequentially displaying on the display the descriptions from the ordered list on the user interface responsive to user actuation; and
   a helper character-generator operative to display a helper character representative of a portion of a description of an item in the ordered list being displayed, the displaying of the helper character being responsive to continued user actuation of the array scroller, wherein the helper character is displayed in a size which is larger than a size of the descriptions, wherein a change in the size is made based on a scrolling speed that is responsive to the continued user actuation.

2. The apparatus of claim 1, wherein the helper character shows additional helper characters by deactivating the array scroller, then reactivating the array scroller.

3. The apparatus of claim 1, wherein the helper character is displayed in a determined location on a GUI display.

4. The apparatus of claim 1, wherein the apparatus comprises at least one of a handheld device, a mobile telephone, and an Internet-enable device with a browser.

5. The apparatus of claim 4, wherein the descriptions are selected from at least one of alpha-numerical characters, pictographs, letters in a name, and prefixes in telephone numbers.

6. The apparatus of claim 1, wherein the data array is multi-dimensional.

7. The apparatus of claim 1, wherein the helper character-generator renders a helper character comprising at least one of an audio feedback, a video feedback, and a tactile feedback.

8. The data processing apparatus of claim 1, wherein the descriptions include alphabetical entries, and the helper character consist of a first alphabetical character of the description of the item in the ordered list being displayed on a display, and wherein deactivating and reactivating the array scroller adds to the display a next alphabetical character of the description.

9. The data processing apparatus of claim 1, wherein the helper character is displayed alphabetical without skipping letters not included portions of the descriptions of the ordered list.

10. A method for enabling a user to scroll through information in items of an ordered list in a data array accessible through a data processing device in a data processing environment, the items having descriptions, the method comprising the acts of:
    enabling the user to scroll sequentially the descriptions from the ordered list, in response to the user actuating the data processing device;
    generating a helper character representative of a portion of a description of an item in the ordered list being displayed; and
    displaying the helper character on a display in response to the user continuing to actuate the data processing device, wherein the helper character is displayed on the display in a size which is larger than a size of the descriptions, and wherein a change in the size is made based on a scrolling speed that is responsive to the continuing actuation.

11. The method of claim 10, wherein the data processing environment comprises a distributed environment.

12. A computer readable medium containing a set of instructions when executed by an information processing apparatus cause the information processing apparatus to display a helper character on a display representative of a portion of a description of an item in an ordered list being displayed, the display of the helper character being responsive to continued user actuation of the apparatus, wherein the helper character is displayed in a size which is larger than a size of descriptions of items of the ordered list, and wherein a change in the size is made based on a scrolling speed that is responsive to the continued user actuation.

13. A client-sever configuration comprising a client and a server, wherein:
   the server provides user-access to an ordered list of information items having descriptions; and
   the client is enabled to interact with the server, the server controlling the client to display a helper character representative of a portion of a description of an item in the ordered list being displayed, the display of the helper character being responsive to continued user actuation of the client, wherein the helper character is displayed in a size which is larger than a size of the descriptions, and wherein a change in the size is made based on a scrolling speed that is responsive to the continued user actuation.

14. The client-server configuration of claim 13, wherein the client comprises at least one of a handheld device, a desktop computer, a laptop computer, a wireless telephone handset, a portable media-playing device, and a cell phone.

15. An information storage medium comprising:
   an ordered list of information items having descriptions;
   at least one respective helper character corresponding with and representative of a portion of a description of an item in the ordered list being displayed on a display, wherein displaying of the helper character is responsive to continued user actuation of a scroller, wherein the helper character is displayed in a size which is larger than a size of the descriptions, and wherein a change in the size is made based on a scrolling speed that is responsive to the continued user actuation; and
   control software for controlling a rendering of a specific one of the helper characters during the actuation of the scroller of the corresponding one of the items.

16. The information storage medium of claim 15, wherein the ordered list comprises at least one a sequence of alphanumeric characters, a sequence of pictographs, a sequence of images, a sequence of sounds.

17. The information storage medium of claim 16, wherein the rendering of the specific one of the helper characters comprises at least one of an audio feedback, a video feedback, and tactile feedback.

18. A data processing apparatus having a user interface assisting in searching for information from an ordered list in a data array, the apparatus comprising:
   a display;
   an array scroller adapted to scroll the information at a speed that is responsive to user actuation; and
   a helper character-generator, actuated by continued user actuation of the array scroller, the helper character generator being operative to display on the display a helper character that represents a scrolling position in the list and at least some of the information corresponding to the scrolling position, wherein the helper character is displayed in a size which is larger than a size of information, and wherein a change in the size is made based on a scrolling speed that is responsive to the continued user actuation.

19. The data processing apparatus of claim 18, wherein the helper character is displayed in a size which is larger that a size of other characters of the information of the ordered list.

* * * * *